United States Patent [19]

Spencer et al.

[11] 4,435,822
[45] Mar. 6, 1984

[54] COHERENT SPREAD SPECTRUM RECEIVING APPARATUS

[75] Inventors: Billie M. Spencer; William S. Cady, both of Bountiful; John W. Zscheile, Jr., Farmington, all of Utah

[73] Assignee: Sperry Corporation, New York, N.Y.

[21] Appl. No.: 379,595

[22] Filed: May 19, 1982

[51] Int. Cl.³ ............................................. H04B 12/00
[52] U.S. Cl. ......................................... 375/1; 375/97; 375/115
[58] Field of Search ................ 178/22.12, 22.13, 22.17; 375/1, 97, 115, 118, 119; 455/26, 30, 257, 259, 260, 265

[56] References Cited

U.S. PATENT DOCUMENTS

| | | | |
|---|---|---|---|
| 4,048,563 | 9/1977 | Osborne | 375/115 |
| 4,203,071 | 5/1980 | Bowles et al. | 375/97 |
| 4,301,537 | 11/1981 | Roos | 375/1 |
| 4,361,891 | 11/1982 | Lobenstein et al. | 375/1 |

Primary Examiner—Benedict V. Safourek
Attorney, Agent, or Firm—John B. Sowell; Kenneth T. Grace; Marshall M. Truex

[57] ABSTRACT

In a digital data acquisition system, there is provided a coherent direct sequence spread spectrum receiving system. The coherent receiving system comprises an independent carrier tracking loop and three independent branches for detecting and locking on to a received psuedonoise data signal. The psuedonoise data signal being transmitted is provided with a time slot or discrete time portion during which no data is modulated onto the carrier. The carrier signal which is not phase modulated with digital data is tracked by the tracking loop so that the absolute phase of the carrier is never lost. The psuedonoise data signals are now recoverable in a coherent direct sequence spread spectrum receiver without the requirement of absolute phase determination or non-coherent detection.

9 Claims, 6 Drawing Figures

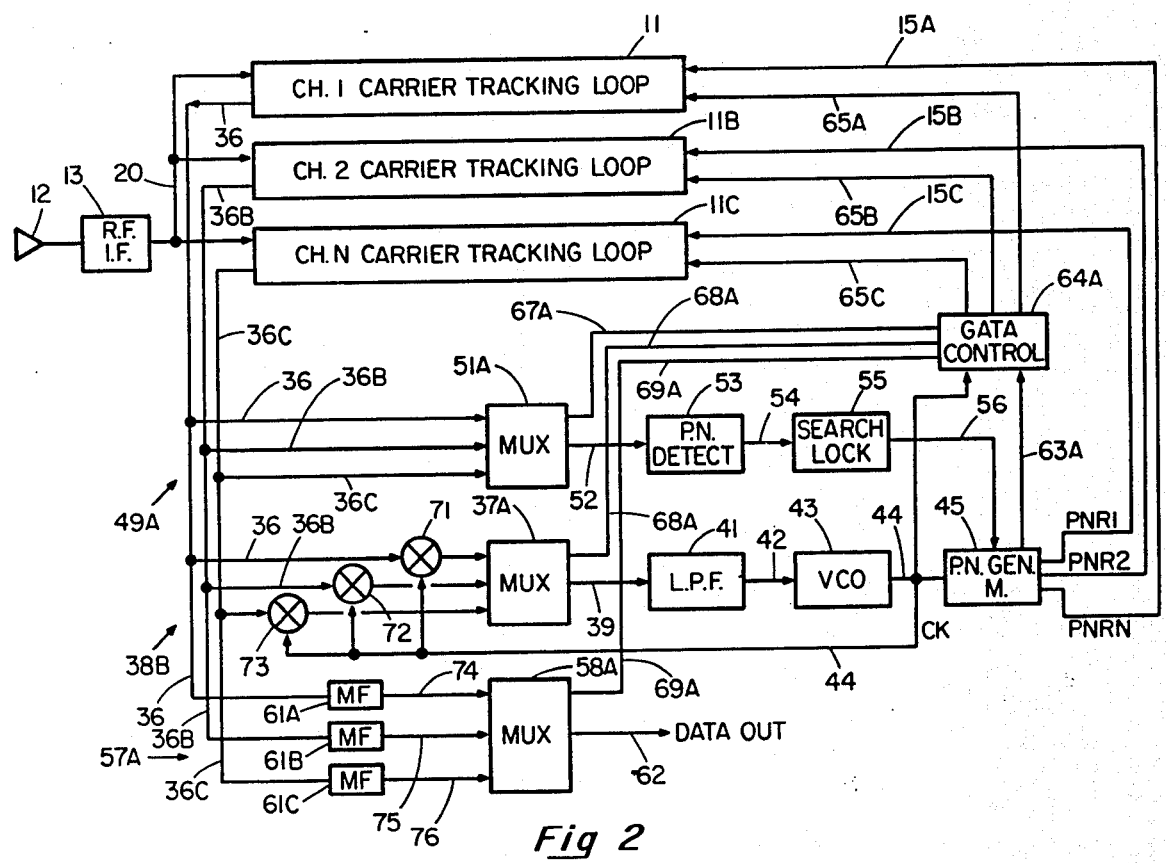
Fig 2
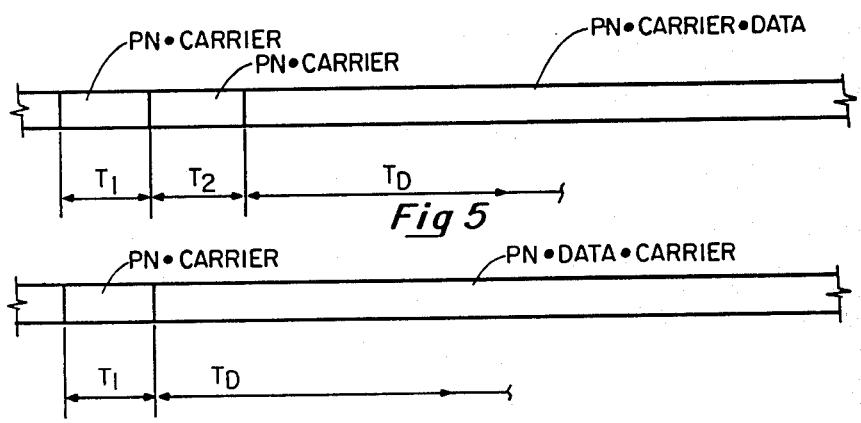
Fig 5
Fig 6

COHERENT SPREAD SPECTRUM RECEIVING APPARATUS

BACKGROUND OF THE INVENTION

1. Field of the Invention

This invention relates to a digital receiving apparatus. More particularly, the present invention discloses a novel receiving apparatus for eliminating phase ambiguities which can occur when the carrier reconstruction loop of the receiver is tracking the incoming carrier signal.

2. Description of the Prior Art

When transmitted signals are received which comprise a carrier signal which is phase modulated with digital data, it is not possible to determine the absolute phase of the carrier.

Prior art systems have avoided this problem by transmitting with the modulated carrier signal an unmodulated tone signal. The recovery loop in the receiver can then track the unmodulated tone signal which will enable the determination of the absolute phase of the unmodulated tone signal and the modulated carrier signal.

When the absolute phase of the carrier signal is known, it is possible to coherently detect the received modulated signal. Without knowledge of the absolute phase of the carrier signal, the data received can be correct or inverted; accordingly, it is necessary to provide some means for determining the phase of the carrier.

In the absence of employing an unmodulated tone signal to determine the absolute phase of the carrier signal, the data which is used to modulate the carrier signal at the transmitter may be encoded before being transmitted. Then a decoder may be employed in the receiving apparatus which will permit the data on the carrier to be recovered in a non-inverted mode without determining the phase of the carrier.

If the prior art system employing an unmodulated tone signal is implemented, the power so employed is unusable for data recovery.

If the prior art system employing both differential encoders and differential decoders is implemented, not only is the cost of the additional apparatus incurred, but also any bit error in the receiving apparatus and the detecting apparatus is doubled by the differential decoder. To now obtain the same bit error rate as with a coherent system it is necessary to increase the transmitting power.

The above problem of acquiring and tracking data modulated carrier signals is compounded when a spread spectrum data code is employed. The code tracking and recovery loops of a spread spectrum data code receiver require that non-coherent tracking be employed when the absolute carrier phase is not known. When non-coherent tracking is employed in such spread spectrum receiving systems, there is an increase in the acquisition time of the spread spectrum code.

It would be desirable to provide a coherent spread spectrum receiver which does not require unmodulated tone signals or encoders and decoders while maintaining knowledge of the absolute phase of the data modulated carrier signal.

SUMMARY OF THE INVENTION

It is the principal object of the present invention to provide a novel coherent spread spectrum receiving system.

It is another principal object of the present invention to provide a coherent receiving system which maximizes the power available for the transmission of a data modulated carrier signal.

It is another object of the present invention to provide a coherent receiving system which decreases the acquisition time for locking onto a spread spectrum code.

It is yet another object of the present invention to provide a coherent receiving system which permits the coherent receiving system to remain locked on to a spread spectrum code and the carrier with a minimum of power requirement.

It is another object of the present invention to provide a coherent receiving system which permits the use of multireceiving channels while employing spread spectrum codes, thus, achieving higher data rates.

It is yet another object of the present invention to provide a coherent receiving system which permits maintaining the absolute phase of all channels in a multi-channel spread spectrum receiving system.

According to these and other objects of the present invention there is provided a coherent receiving system which comprises a receiver having an independent carrier tracking loop and three independent branches or loops for detecting and locking on to the received pseudonoise data signal and a third separate branch for recovering data from said pseudonoise data signal. A discrete time portion of the transmitted signal is provided during which no data is modulated onto the carrier, thus, permitting coherent recovery of the carrier signal and the pseudonoise signals with absolute phase determination.

BRIEF DESCRIPTION OF THE DRAWINGS

FIG. 2 is a block diagram of a modified preferred embodiment multichannel coherent spread spectrum receiving system.

FIG. 5 is a schematic timing diagram which is employed to explain the recovery of data from FIGS. 1 and 3; and FIG. 6 is a schematic timing diagram which is employed to explain the recovery of data from the embodiment of FIGS. 2 and 4.

DESCRIPTION OF THE PREFERRED EMBODIMENT

Figure 1:
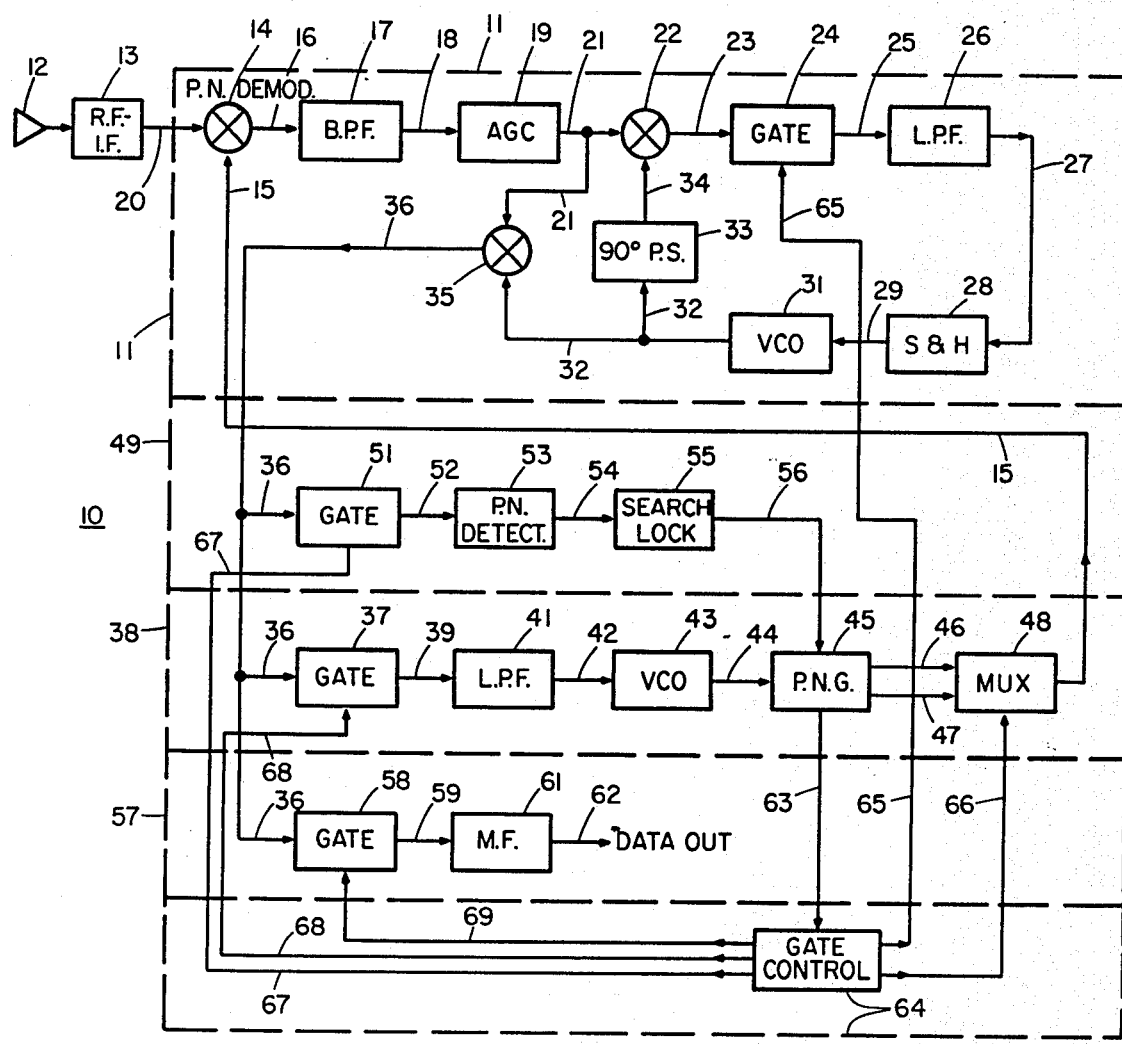
FIG. 1 is a block diagram of a preferred embodiment single channel coherent spread spectrum receiving system.

Refer now to FIG. 1 showing a preferred embodiment of the novel coherent spread spectrum receiving system 10. Receiving system 10 comprises a carrier tracking loop 11 and three independent branches which will be explained in detail hereinafter. Receiving antenna 12 is adapted to receive a signal which is transmitted from a remote location and comprises a carrier signal which is modulated by data and a pseudonoise code. The received signal is applied to a radio frequency to intermediate frequency processor 13 and the processed signal is applied to a PN demodulator via line 20. A replica of the pseudonoise signal on line 15 is generated in one of the branches and also applied to the PN demodulator 14 to produce an output signal on line 16 which is applied to a bandpass frequency filter 17. The output of filter 17 on line 18 is applied to an automatic gain control 19 and the output signal therefrom on line 21 is applied to a mixer 22 which performs the function of a phase detector. The output from mixer 22 on line 23 is applied to a gate 24 which is in a normally disabled condition. When the gate 24 is enabled the signal on line 25 is applied to the low pass filter 26 and the output on line 27 is applied to the sample and hold device 28. The output from sample and hold device 28 is applied via line 29 to the voltage controlled oscillator 31. The output from voltage controlled oscillator 31 on line 32 is first applied to 90 degree phase shifter 33 to provide an output on line 34 which is applied to the mixer 22. The application of the phase shifted signal on line 34 to mixer 22 is to provide quadrature tracking of the signal on line 21. When the carrier tracking loop 11 is tracking, the signal on line 32 is in absolute phase with the signal on line 21. Accordingly when the signal on line 21 and line 32 is applied to the coherent detector 35 there is provided an output on line 36 which is coherently reduced to a baseband signal. Thus, it will be understood that the signal being presented on line 36 comprises the detected PN signal and the data signal without the carrier signal. The signal on line 36 is always present even though the gate 24 may be disabled. When the gate 24 is enabled the carrier tracking loop is active and the sample and hold device 28 is active or sampling the signal on line 27 so that the carrier tracking loop 11 maintains its absolute phase with the signal on line 21. When the gate 24 is disabled the sample and hold device 28 is in its holding mode and continues to produce a signal on line 29 which causes the signal on line 32 to remain in substantially absolute phase with the signal on line 21 until the next refresh cycle.

The coherently detected signal on line 36 is applied to gate 37 of the code tracking branch 38. The output from gate 37 on line 39 is applied to a low pass filter 41 and the output therefrom on line 42 is applied to a voltage controlled oscillator 43. The clock tracking signal on line 42 produces a clock at the output of voltage controlled oscillator on line 44 which is applied to the continuous free running pseudonoise generator 45. Output line 46 from pseudonoise generator 45 produces a replica of the pseudonoise generated signal which is received at antenna 12. The second output line 47 from pseudonoise generator is provided as a clock signal mixed with the replica pseudonoise code signal. These signals on lines 46 and 47 are applied to multiplexer 48 which is capable of selecting one of the two signals and producing an output on line 15 which was applied to the pseudonoise (PN) demodulator 14.

When the code tracking branch 38 first becomes operable the pseudonoise generator 45 is not tracking the receive signal from antenna 12. There is further provided a code search and locking branch 49. The code search and locking branch 49 comprises a gate 51 coupled to the output line 36. The output from gate 51 on line 52 is applied to a pseudonoise detector 53 which produces a lock indicating signal on line 54 which is applied to the search lock device 55. When the pseudonoise generator 45 is properly tracking the pseudonoise generated code being received at antenna 12 there is no correction signal presented on line 56. However, when the generator 45 is not properly tracking the incoming pseudonoise generated signal being received on antenna 12 there is an error correction signal on line 56 which causes the PN generator to slip in timing so as to find the proper alignment and lock.

Assume now that the pseudonoise generator 45 is properly tracking the incoming pseudonoise signal being received at antenna 12. Then the receiving system 10 is in proper alignment condition for recovering data. Data detection branch 57 is also provided with an input signal from line 36 which is applied to gate 58. When gate 58 is actuated, signals comprising only data are presented on line 59 which are filtered in the matched filter 61 to provide the recovered digital data on line 62. The replica of the pseudonoise code is also being presented on line 63 and applied to the gate control 64. Gate control 64 comprises a plurality of registers having stored therein predetermined epochs which are compared with the epoch being presented on line 63. When the comparison is made with a predetermined epoch a signal is presented on one of the gate control output lines. In the preferred embodiment of the present invention a gate enable signal is presented on line 65 which is applied to gate 24 to enable an output to be produced on line 25. At the same time an enable signal is presented on control line 65, an enable signal is also presented on control line 66 which causes an output from the multiplexer 48 to be produced on line 15 and applied to the pseudonoise demodulator 14. When the multiplexer 48 is enabled the pseudonoise replica code signal on line 46 is being presented on line 15. At the same time control line 65 and 66 are presenting their enable signals, an enable signal is also provided on control line 67 and is applied to gate 51 to enable an output on line 52. In the preferred embodiment shown in FIG. 1 the enable signal on the control line 68 is produced after the enable signals on lines 65, 66 and 67 have appeared and terminated. When the enable signal on line 66 is terminated the clock mixed with the pseudonoise replica signal on line 47 is presented on line 15 and the gate 37 is enabled so as to produce a clock control signal on line 39. After the enable signal on control line 68 has terminated the enable signal on line 69 is activated to enable gate 58 to produce the data on output line 59 and to cause the recovered data to appear on output line 62. When gate 58 is enabled to produce the data output at line 62 the multiplexer 48 is also enabled via line 66 to again produce the pseudonoise replica signal on line 15. When the last of the data is presented on output line 62 the control line 69 disables gate 58 and the cycle starts anew.

Refer now to FIG. 2 showing a modified preferred embodiment of the present invention having a plurality of carrier tracking loops. Carrier tracking loop 11 is identical to the aforementioned carrier tracking loop 11 in FIG. 1. Carrier tracking loops 11B and 11C are identical to carrier tracking loop 11. It will be understood that even though there are a plurality of channels and a plurality of carrier tracking loops that each of the carrier tracking loops 11, 11B and 11C are continuously tracking their respective channel signal and producing an output on output line 36, 36B and 36C respectively. The signals on lines 36, 36B and 36C are applied to the multiplexers 51A, 37A and 58A respectively even though only a single output is produced from the multiplexers. Accordingly it will be sufficient to explain only the operation of one of the multiplexers in detail for a thorough understanding of the operation of all three carrier tracking loops. Assume that channel 1 and its carrier tracking loop 11 is active. This means that the control line 65A is producing an enabled signal causing the gate inside of carrier tracking loop 11 to be enabled and producing an output signal on its output line 25. In the preferred embodiment of FIG. 2 when tracking loop 11 is active the signal on line 36 to multiplexer 51A and the signal on line 36 to multiplexer 37A are enabled to pass to the output lines 52 and 39 by operation of the enabled signals on lines 67A and 68A respectively. It will be understood that only one of the signals on line 36, 36B and 36C to multiplexer 51A are being passed to the output line 52 at any one time. The sync times for the different carrier tracking loops are staggered so that they do not overlap and the synchronization of the PN generator 45 by the sync signal on line 36 will also synchronize PN generator 45 for the other carrier tracking loops 11B and 11C, etc., because the relationship of the different tracking loop signals in each of the channels are predetermined and known. Thus, the output signal on line 52 from mux 51A is a search lock detect signal and will continue to operate in a fashion in which the PN generator 45 is synchronized more often than with a single channel embodiment.

Further assuming that the sync signal from channel 1 and carrier tracking loop 11 is being presented on output line 36, the sync signal is being applied to mixer 71 to provide a track error signal at the input of multiplexer 37A. It will be understood that no track error signal is being applied to the mixers 72 and 73 associated with channels 2 and channels N of carrier tracking loops 11B and 11C at this time. Since we have assumed that carrier tracking loop 11 is active, a track error signal is being presented on line 39 to the low pass filter 41 and the output from low pass filter 41 on line 42 is applied to the voltage controlled oscillator 43 to provide a clock signal on line 44 which provides the proper timing to pseudonoise generator 45 and gate control 64A. Further, the clock signal on line 44 is recirculated back as an input to all of the mixers 71, 72 and 73 to provide synchronization. Having explained the operation of carrier tracking loop 11 with reference to both FIG. 1 and FIG. 2 it will now be understood that when the sync signal is appearing on line 36B to mixer 72 that its error tracking signal is being presented at the output of the voltage controlled oscillator 43 to provide the synchronized clock signal on line 44 for purposes of maintaining proper tracking of pseudonoise generator 45 with the incoming pseudonoise code signal at receiver antenna 12.

Having explained the operation of multiplexers 51A and 37A it should be understood that these multiplexers are constantly receiving sync signals at the same time and are continuing to perform their respective search and lock operation and tracking operations. However, the operation of the data output line 62 is operating in a slightly different manner from that explained heretofore with regard to FIG. 1 and the data detection branch 57.

Assume further that carrier tracking loop 11 is active and the output on output line 36 is in the sync phase. During the sync phase the sync signal is applied to matched filter 61A to provide an unused signal at line 74. However, during this same sync time for channel 1 data is being presented on output line 36B and output line 36C which is applied to matched filters 61B and 61C to provide data on the connecting lines 75 and 76 to multiplexer 58A. In this preferred mode of operation the multiplexer 58A will pass the data on lines 75 and 76 by parallel to serial multiplex conversion to provide data output on line 62 from channels 2 and channels N. Thus, it will be understood that in the preferred embodiment shown in FIG. 2 that there is always data being presented at the data output line 62 from multiplexer 58A and there is always one active sync signal being applied to the multiplexers 51A and 37A.

It will now be understood that pseudonoise generator 45 is a single pseudonoise generator and is capable of presenting three different pseudonoise reference signals on lines 15A, 15B and 15C even though being generated from a single pseudonoise generator. Thus, the pseudonoise replica signals on lines 15A, 15B and 15C are time delay versions of each other.

Having explained the operation of the gated input multiplexers 51A and 37A and 58A it will be understood that the control lines from gate control 64A shown as control lines 67A, 68A and 69A are not single lines but comprise a plurality of lines which control the multiple gates at the inputs of these multiplexers. Other than having a plurality of control lines the gate control 64 is operating in substantially the same manner as the gate control 64 of FIG. 1. Further, the control line 63A connecting the PN generator 45 to the gate control 64A comprises three separate lines which present the three pseudonoise replica signals to the gate control 64A.

Figure 3:
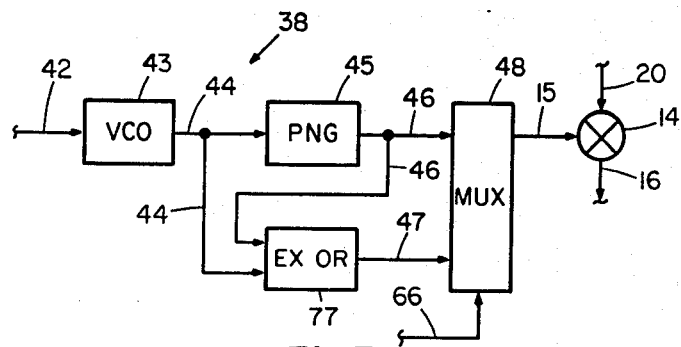
FIG. 3 is a block diagram in greater detail of a portion of the code tracking branch of FIG. 1.

Refer now to FIG. 3 showing a more detailed explanation of how the signals are produced for input to the pseudonoise demodulator 14. The partial block diagram showing the code tracking branch 38 starts with line 42 which has the tracking error signal thereon. The tracking error signal on line 42 is presented to the voltage controlled oscillator 43 and provides an output clock signal on line 44 which is applied to the pseudonoise generator 45 and also applied to the exclusive OR gate 77. The output from the pseudonoise generator 45 on line 46 is the PN code which is assumed to be locked on or tracking the received signal and this signal is also applied via line 46 to the second input of exclusive OR gate 77 to provide an output on line 47 which is essentially the clock times the PN signal being generated at the output of the pseudonoise generator 45 whereas the signal on line 46 is the pseudonoise generated code without the clock signal being mixed thereon. These two signals on line 46 and 47 are applied to multiplexer 48 under the control of control line 66 to cause the multiplexer to pass one of the two signals to the output line 15 which is connected to the input of the pseudonoise demodulator 14. During synchronization time the signal on line 15 will comprise the signal on line 47 and during data transfer time the signal on line 15 will be the signal on line 46.

Figure 4:
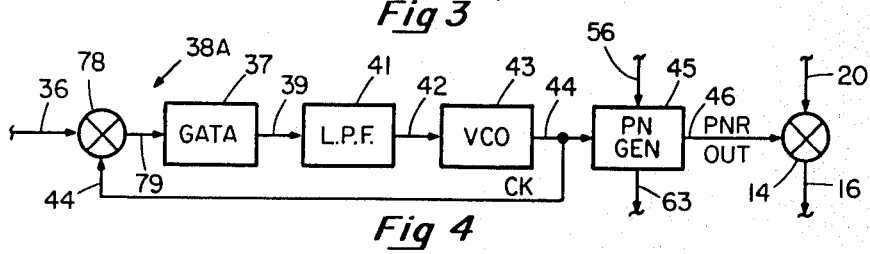
FIG. 4 is a block diagram of a modification of a portion of the code tracking branch of FIG. 3.

Refer now to FIG. 4 showing an improved and modified form of a code tracking branch 38A which may be employed in either FIG. 1 or FIG. 2. The output of the coherent detector 35 on line 36 is now presented to a mixer 78 to provide the tracking loop error signal mixed with the clock on line 79. This signal is applied to the gate 37 which when enabled passes the signal to line 39 which is applied to the low pass filter 41. The output from low pass filter 41 on line 42 is applied to the voltage controlled oscillator 43 to produce a clock signal on line 44. It will be noted that this clock signal is also the clock input to mixer 78 to provide this new signal. The clock signal on line 44 is applied to the pseudonoise generator 45 which now produces the pseudonoise replica signal on output line 46 and this signal alone is applied to the pseudonoise demodulator 14. It will be noted that there is no longer a requirement for the pseudonoise replica signal mixed with the clock signal on line 15 as discussed with regards to FIG. 1. As will be explained hereinafter this new modification will enhance the duty cycle of the receiving system 10.

Refer now to FIG. 5 which is a schematic timing diagram for explaining the duty cycle and operation of FIG. 1. During the time shown as T1 the carrier tracking loop 11 is enabled and is accomplishing its sync operation. Also during the time T1 the code search and lock branch 49 is enabled so that it is locking on to the received pseudonoise signal. During the sync time shown as T1 the antenna 12 is receiving a pseudonoise signal which is modulated on to the carrier. Also during the time shown as T1 the signal being presented on line 15 to the pseudonoise demodulator 14 comprises the signal on line 46 from the PN generator which is the PN replica signal without a clock. Thus it will be understood that gates 24 and 51 are enabled during the sync time T1 and are disabled during the sync time T2. During the sync time T2 the gate 37 in the code tracking branch 38 is enabled and the code tracking branch 38 again synchronizes itself with the incoming pseudonoise generated signal being applied on the input line 36. Also during the sync time T2 the receiver is receiving the pseudonoise generated signal modulated on to the carrier. However, during the sync time T2 the signal on line 15 to the pseudonoise demodulator 14 is the signal from line 47 which comprises the pseudonoise generated replica signal mixed with the clock signal. During the time shown as $T_D$ which is the data transfer time, the signal on line 15 now reverts to the pseudonoise replica signal from line 46 and the incoming signal at the receiver and antenna 12 includes the pseudonoise generated signal and the data signal which is modulated on to the carrier. During the time shown as $T_D$ the gates 24, 51 and 37 are disabled and the gate 58 in the data detection branch 57 is enabled.

Refer now to FIG. 6 which is a timing diagram for the explanation of FIG. 2. For purposes of this explanation the schematic timing diagram in FIG. 6 is only associated with one of the carrier tracking loops. Assume that this timing diagram is associated with the carrier tracking loop 11, thus, during the sync time T1 the carrier tracking loop 11 is active. Also the code search and lock branch 49A, the code tracking branch 38B are active during T1 time to simultaneously accomplish tracking and locking onto the pseudonoise generated signal, thus, it will be understood that the gate similar to gate 24 in tracking loop 11 and the multiplexing input gates in multiplexers 51A and 37A are active to cause the signals on line 36 to be transmitted to the respective output lines 52 and 39. During the time T1 in FIG. 6, the signal being received at antenna 12 is the pseudonoise generated signal modulated onto the carrier and the signal being applied to the pseudonoise demodulator 14 via line 15A is the pseudonoise generated signal only which is the signal on line 46 of FIG. 1 and the signal on line 15A of FIG. 2 and in the modified embodiment shown in FIG. 4 is the signal on line 46. Thus, it will be understood that employing the modification of FIG. 4 which, is a similar modification shown in FIG. 2, that the two synchronization times T1 and T2 shown in FIG. 5 may be consolidated into T1 time as shown in FIG. 6. During the time $T_D$ which is the data transfer time, the signal being received at antenna 12 includes the pseudonoise generated signal and the data modulated onto the carrier signal, thus, the preferred embodiment signal being applied to the pseudonoise demodulator 14 on line 15 or line 46 is the PN pseudonoise generated replica signal alone.

Refer now to FIG. 2 and to the three carrier tracking loops 11, 11B and 11C. It will be understood that all three of these carrier tracking loops are active during T1 time but that the T1 time for each of the carrier tracking loops is staggered so that they do not occur simultaneously. Thus, it will be understood that the carrier tracking loop 11 can accomplish its synchronization function and start its transfer of data and during its transfer of data time the carrier tracking loop 11B can accomplish its synchronization function and start its transfer of data. In the same manner the carrier tracking loop 11C can accomplish its synchronization and start its transfer of data and all three of the channels operating at different frequencies can then be transferring data through the data detection branch 57A. The matched filters 61A, 61B and 61C are employed to recover the digital data and the multiplexer 58A converts the data via parallel to serial conversion to provide all of the data outputs on line 62.

Having explained the preferred embodiment operation of FIG. 2 employing only three channels, it will be understood that the number of channels may be extended to a very large number which is only limited by a decrease in the sync time T1 available on any one channel. Further, it will be understood that the duty cycle of the transfer of data time relative to the sync time can be improved substantially by using the preferred embodiment shown in FIG. 4 in the FIG. 1 embodiment. This is to say that when the code tracking branch 38A shown in FIG. 4 is embodied into the simplified structure of FIG. 1 that the signal on the output line 15 is always the signal which appears at line 46 in the FIG. 1 embodiment. Having explained with reference to FIG. 2 that each of the plurality of channels may transfer data simultaneously, it will further be understood that the FIG. 2 embodiment showing a multichannel implementation permits its conversion to direct sequence frequency hopping. To accomplish direct sequence frequency hopping in the FIG. 2 embodiment, it is only necessary that the control 64A enable only one of the carrier tracking loops at one time and that the transmitter which is not shown be transmitting only the single channel which is being enabled in a predetermined sequence and predetermined manner so that the gate control 64A is constantly hopping or changing to synchronize with the incoming signal on the receiving antenna 12. All of the other synchronizing signals and mode of recovery remain the same. Thus, it will be understood that the FIG. 2 system is no longer receiving data from a plurality of channels simultaneously.

Having explained two preferred embodiment coherent direct sequence spread spectrum receiving systems and modifications thereof, it will now be understood that prior art non-coherent receiving systems and their associated problems may be eliminated. Thus, small signal supression, which is caused by excessive bandwidths and the need for a non-linear function, are eliminated in the present coherent receiving system.

In the present invention coherent receiving systems, all signal tracking is accomplished in a coherent mode of operation. Thus, the requirement for more expensive and more complex non-coherent tracking systems such as tau-dither loops and delay lock loops are eliminated.

During the time the acquisition and tracking loops and branches are operational, there is no data being modulated onto the carrier. Thus, the tracking and acquisition functions are totally independent of the data rates and large processing gains are provided during the acquisition and tracking operation which were not accomplished in the prior art systems.

We claim:

1. A coherent direct sequence spread spectrum receiver of the type adapted to receive a carrier signal that has been modulated by data and a pseudonoise code, comprising:

signal receiving means carrier tracking loop means connected to said receiver means for coherently tracking the carrier signal, said carrier tracking loop means comprising a pseudonoise demodulator at the input and a coherent detector at the output, said pseudonoise demodulator having an input connected to said signal receiving means and having an output coupled to said coherent detector of said carrier tracking loop, an output line coupled to said coherent detector for providing thereon detected pseudonoise code signals and data signals, a code tracking branch coupled to said output line for coherently tracking the received pseudonoise code and for generating a clock signal and a replica signal of said received pseudonoise code, a continuous running pseudonoise generator in said code tracking branch for generating said replica signals coupled to said pseudonoise demodulator, first gating means in said carrier tracking loop means, second gating means in said code tracking branch, and gate control means coupled to said code tracking branch for enabling said first gating means when said carrier tracking loop is tracking said carrier signal and for enabling said second gating means when said pseudonoise generator is tracking said received pseudonoise generated code on said output line.

2. A coherent direct sequence spread spectrum receiver as set forth in claim 1, wherein said gate control means comprises timing means for simultaneously enabling said first gating means and said second gating means.

3. A coherent direct sequence spread spectrum receiver as set forth in claim 1 which further includes:

a code search and lock branch coupled to said output line for coherently detecting the tracking error between said received pseudonoise code and said replica signals, third gating means in said code search and lock branch, and wherein said gate control means comprises timing means for simultaneously enabling said first, second and third gating means.

4. A coherent direct sequence spread spectrum receiver as set forth in claim 1 which further includes:

a code search and lock branch coupled to said output line for coherently detecting the tracking error between said received pseudonoise code and said replica signals, third gating means in said code search and lock branch, and wherein said gate control means comprises timing means for simultaneously enabling said first and said third gating means and subsequentially enabling said second gating means.

5. A coherent direct sequence spread spectrum receiver as set forth in claim 1 which further includes:

a code search and lock branch coupled to said output line, third gating means in said code search and lock branch, a data detection branch coupled to said output line, fourth gating means in said data detection branch, and wherein said gate control means comprise timing means for enabling said gating means whereby the carrier signal and the received pseudonoise code signal are coherently tracked and the subsequently generated data signal is coherently detected.

6. A coherent direct sequence spread spectrum receiver as set forth in claim 5 wherein said carrier tracking loop means comprises a plurality of individual carrier tracking loops, each said carrier tracking loop having its own pseudonoise demodulator, coherent detector, and output line connectable to said branches.

7. A coherent direct sequence spread spectrum receiver as set forth in claim 6 wherein said second, third, and fourth gating means each comprise multiplexers adapted to connect one of said output lines from one of said individual carrier tracking loops to said branches.

8. A coherent direct sequence spread spectrum receiver as set forth in claim 1 wherein said carrier tracking loop means comprises a plurality of individual tracking loop, and wherein said second gating means comprises a multiplexer for connecting the output line of one of said carrier tracking loop to said code tracking branch.

9. A coherent direct sequence spread spectrum receiver as set forth in claim 8 which further includes a mixer connected in series in each said output line connected to said multiplexor, and clock signal line means connecting said clock signal to said mixers.

* * * * *